(12) United States Patent
Ellenbeck et al.

(10) Patent No.: US 9,584,253 B2
(45) Date of Patent: Feb. 28, 2017

(54) MOBILE COMMUNICATION TERMINAL DEVICE AND METHOD FOR OPERATING A MOBILE COMMUNICATION TERMINAL DEVICE

(71) Applicant: Intel IP Corporation, Santa Clara, CA (US)

(72) Inventors: Jan Ellenbeck, Munich (DE); Ralph Hasholzner, Munich (DE); Thorsten Clevorn, Munich (DE); Sabine Roessel, Munich (DE); Stefan Franz, Munich (DE); Juergen Kreuchauf, San Francisco, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 49 days.

(21) Appl. No.: 14/080,848

(22) Filed: Nov. 15, 2013

(65) Prior Publication Data

US 2015/0139080 A1    May 21, 2015

(51) Int. Cl.
*H04W 72/04*    (2009.01)
*H04L 1/00*    (2006.01)
*H04W 52/02*    (2009.01)
*H04W 52/04*    (2009.01)
*H04W 28/02*    (2009.01)
(Continued)

(52) U.S. Cl.
CPC .............. *H04L 1/00* (2013.01); *H04W 52/02* (2013.01); *H04W 52/0216* (2013.01); *H04W 52/04* (2013.01); *H04L 47/2416* (2013.01); *H04L 47/2483* (2013.01); *H04W 28/0278* (2013.01); *H04W 52/365* (2013.01); *H04W 72/04* (2013.01); *H04W 72/1278* (2013.01)

(58) Field of Classification Search
None
See application file for complete search history.

(56) References Cited

U.S. PATENT DOCUMENTS

2011/0134774 A1*  6/2011  Pelletier et al. .............. 370/252
2012/0057547 A1*  3/2012  Lohr et al. .................... 370/329
(Continued)

FOREIGN PATENT DOCUMENTS

FR        EP 0868093        *  9/1998

OTHER PUBLICATIONS

[1] 3GPP Ts 36.101 V12.1.0 (Sep. 2013), "3rd Generation Partnership Project; Technical Specification Group Radio Access Network; Evolved Universal Terrestrial Radio Access (E-UTRA); User Equipment (UE) radio transmission and reception (Release 12)", Chapter 6.2.5.

*Primary Examiner* — Vinncelas Louis (57) ABSTRACT

A communication terminal device is provided, including: a transceiver configured to communicate with a communication device in accordance with an uplink resource allocation; a determiner configured to determine a desired power consumption for data transmissions from the communication terminal device to the communication device, and to determine a suitable uplink resource allocation based on the desired power consumption; and a controller configured to determine a communication behavior of the communication terminal device with the communication device based on the suitable uplink resource allocation and to control the transceiver according to the determined communication behavior.

17 Claims, 5 Drawing Sheets

(51) Int. Cl.
    *H04L 12/851*     (2013.01)
    *H04L 12/853*     (2013.01)
    *H04W 72/12*     (2009.01)
    *H04W 52/36*     (2009.01)

(56) References Cited

U.S. PATENT DOCUMENTS

| | | | |
|---|---|---|---|
| 2013/0322331 A1* | 12/2013 | Ramkumar | H04W 28/10 370/328 |
| 2014/0064253 A1* | 3/2014 | Deivasigamani | H04W 36/30 370/332 |
| 2014/0072029 A1* | 3/2014 | Zhai et al. | 375/240.02 |

* cited by examiner

MOBILE COMMUNICATION TERMINAL DEVICE AND METHOD FOR OPERATING A MOBILE COMMUNICATION TERMINAL DEVICE

TECHNICAL FIELD

Embodiments described herein generally relate to a mobile communication terminal device and a method for operating a mobile communication terminal device for reducing transmission power.

BACKGROUND

It is typically the goal of a mobile communication terminal device to transmit data in the uplink as fast as possible, i.e., with the highest data rate possible. Due to the form factors e.g. of today's smartphones thermal problems like overheating are due to intense activity of the modem of the communication terminal device critical.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

3GPP (3rd Generation Partnership Project) has introduced LTE (Long Term Evolution) into the Release 8 version of UMTS (Universal Mobile Telecommunications System) standards.

The air interface of an LTE communication system is called E-UTRA (Evolved Universal Terrestrial Radio Access) and is commonly referred to as '3.9G'. In December 2010, the ITU recognized that current versions of LTE and other evolved 3G technologies that do not fulfill "IMT-Advanced" requirements could nevertheless be considered '4G', provided they represent forerunners to IMT-Advanced and "a substantial level of improvement in performance and capabilities with respect to the initial third generation systems deployed already. LTE is therefore sometime also referred to as '4G' (mainly for marketing reasons).

In comparison with its predecessor UMTS, LTE offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction, for example. LTE supports scalable bandwidths of from 1.4 MHz to 20 MHz and is based on new multiple access methods, such as OFDMA (Orthogonal Frequency Division Multiple Access)/TDMA (Time Division Multiple Access) in downlink direction (tower, i.e. base station, to handset, i.e. mobile terminal) and SC-FDMA (Single Carrier-Frequency Division Multiple Access)/TDMA in uplink direction (handset to tower). OFDMA/TDMA is a multicarrier multiple access method in which a subscriber (i.e. a mobile terminal) is provided with a defined number of subcarriers in the frequency spectrum and a defined transmission time for the purpose of data transmission. The RF (Radio Frequency) capability of a mobile terminal according to LTE (also referred to as User Equipment (UE), e.g. a cell phone) for transmission and reception has been set to 20 MHz, for example. A physical resource block (PRB) is the baseline unit of allocation for the physical channels defined in LTE. It includes a matrix of 12 subcarriers by 6 or 7 OFDMA/SC-FDMA symbols. At the physical layer a pair of one OFDMA/SC-FDMA symbol and one subcarrier is denoted as a 'resource element'. A communication system that is used according to an aspect of this disclosure and which for example a communication system according to LTE is described in the following with reference to FIG. 1.

Figure 1:
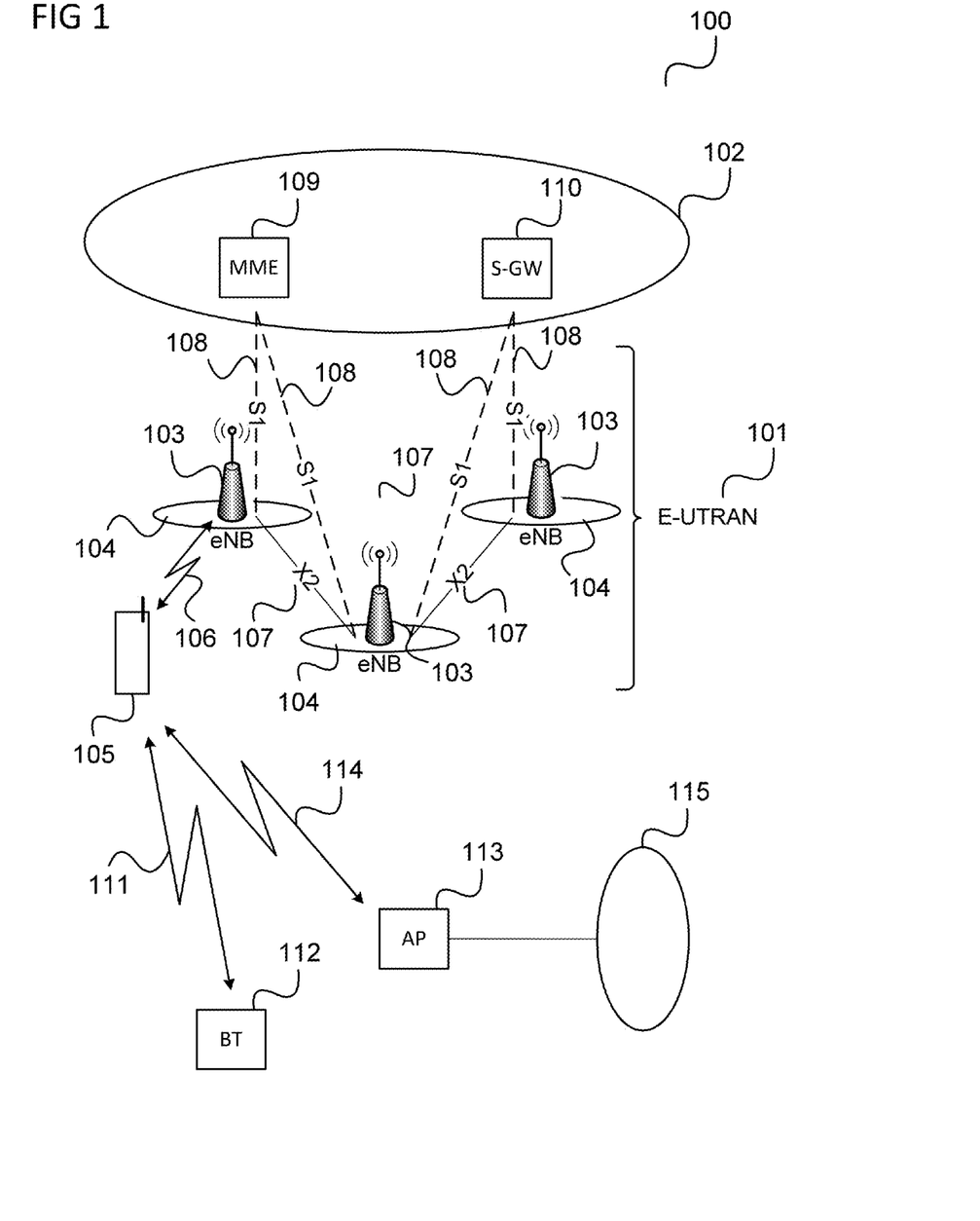
FIG. 1 shows a communication system.

FIG. 1 shows a communication system 100.

The communication system 100 is a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment) 105 located in a mobile radio cell 104 may communicate with the core network 102 and with other mobile terminals 105 via the base station providing coverage in (in other words operating) the mobile radio cell. In other words, the base station 103 operating the mobile radio cell 104 in which the mobile terminal 105 is located provides the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 via a S1-MME interface and to a Serving Gateway (S-GW) 110 by means of an S1-U interface. The S1 interface supports a many-to-many relation between MMEs/S-GWs 109, 110. The base stations 103, i.e. a base station 103 can be connected to more than one MME/S-GW 109, 110. An MME/S-GW can 109, 110 be connected to more than one base station 103. This enables network sharing in LTE.

For example, the MME 109 may be responsible for controlling the mobility of mobile terminals located in the coverage area of E-UTRAN, while the S-GW 110 is responsible for handling the transmission of user data between mobile terminals 105 and core network 102.

In case of LTE, the radio access network 101, i.e. the E-UTRAN 101 in case of LTE, can be seen to consist of the base station 103, i.e. the eNBs 103 in case of LTE, providing the E-UTRA user plane (PDCP/RLC/MAC) and control plane (RRC) protocol terminations towards the UE 105.

An eNB 103 may for example host the following functions:

Functions for Radio Resource Management: Radio Bearer Control, Radio Admission Control, Connection Mobility Control, dynamic allocation of resources to UEs 105 in both uplink and downlink (scheduling);
IP header compression and encryption of user data stream;
Selection of an MME 109 at UE 105 attachment when no routing to an MME 109 can be determined from the information provided by the UE 105;
Routing of User Plane data towards Serving Gateway (S-GW) 110;
Scheduling and transmission of paging messages (originated from the MME);
Scheduling and transmission of broadcast information (originated from the MME 109 or O&M (Operation and Maintenance));
Measurement and measurement reporting configuration for mobility and scheduling;
Scheduling and transmission of PWS (Public Warning System, which includes ETWS (Earthquake and Tsunami Warning System) and CMAS (Commercial Mobile Alert System)) messages (originated from the MME 109);
CSG (Closed Subscriber Group) handling.

Each base station of the communication system 100 controls communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located (and on which it is camping). If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

As the mobile terminal 105 continues to move throughout the coverage area of the communication system 100, control of the call may be transferred between neighboring mobile radio cells 104. The transfer of calls from mobile radio cell 104 to mobile radio cell 104 is termed handover (or handoff).

In addition to the communication via the E-UTRAN 102, the mobile terminal 105 may support communication via a Bluetooth (BT) communication connection 111, for example to another mobile terminal 112 and communication a WLAN communication connection 114 to a WLAN access point (AP) 113. Via the access point 113, the mobile terminal may access a communication network 115 (e.g. the Internet) which may be connected to the core network 102.

For the allocation of data transmissions LTE uses OFDMA (Orthogonal Frequency-Division Multiple Access) or SC-FDMA (Single-carrier frequency-division multiple access) based technologies. Frequency Division Multiple Access or FDMA is a channel access method used in multiple-access protocols as a channelization protocol. FDMA gives users an individual allocation of one or several frequency bands, or channels. LTE or 802.16m, use orthogonal medium access in the uplink where scheduling grants typically indicate the exact and exclusively reserved time/frequency resource along with a specifically selected transport format (i.e. modulation and coding). In these situations the mobile station cannot autonomously decide for a smaller resource allocation or a lower rate transport format itself. In fact, to allow its payload bits to be received correctly, the mobile station would even have to add padding bits to uplink data and spend power on transmitting these in case it would not want to fill the allocated resources with payload bits.

In general, a resource allocation can refer to the selected combination of frequency subbands, time intervals, transmit powers (potentially varying over the time and/or frequency dimension), modulation techniques, channel coding scheme and code rate, and spatial stream to transmit antenna mapping (precoding) for MIMO uplinks. For example, in LTE systems this can encompass: the PRBs for UL transmission, the modulation and coding scheme (MCS), the precoder, and the transmit power, which is determined based on open-loop power control components as well as closed-loop power control commands sent by the eNB, where the current power can be the result of a sequence of power control commands.

Figure 2:
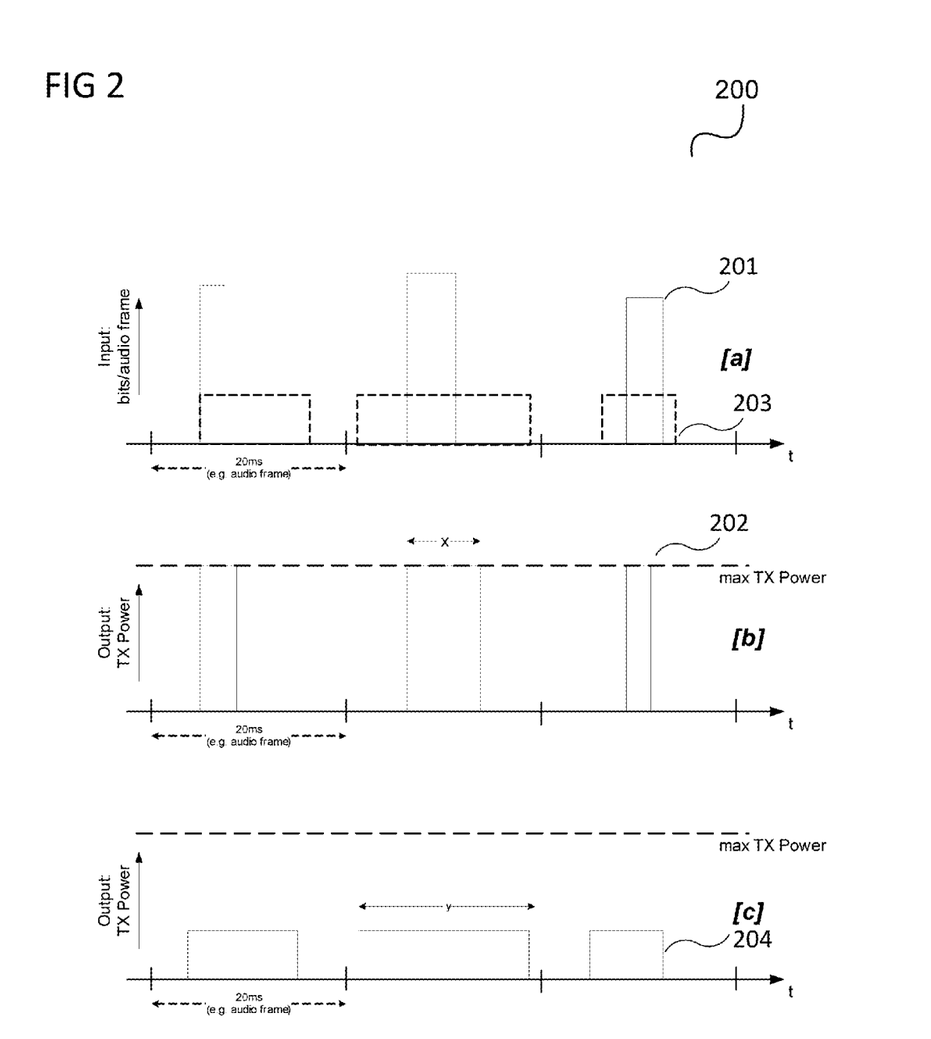
FIG. 2 shows an exemplary diagram for Tx power adaptation.

FIG. 2 shows an exemplary diagram 200 for Tx power adaptation.

The amount of data within a single real-time frame can vary depending on the encoding and data volume during each frame on application level, indicated by solid line 201 in diagram. In the diagram bursty traffic [a] is shown and how these bursts can be transmitted during longer and shorter transmission bursts that coincide with a lower or higher instantaneous Tx power, respectively. For example, as soon as the input queue has data to transmit, the modem could be scheduled to send out the data as quickly as possible, resulting in max TX power for a duration x per audio frame 202. The BS provides resources for the transmission in the form of short bursts because it does not consider that the transmission could be stretched, as shown in diagram [b].

In order to reduce the transmission data rate it could be desired that the modem instead sends out the data within one audio frame with much lower power. This can be achieved by spreading the TX power within this audio frame to a longer duration. The transmission illustrated in diagram [b] has a shorter duration with a higher power than the transmission illustrated in diagram [c] which has a longer duration at a lower power. It is a priori not clear which alternative [b] or [c] might be preferred by the modem. The application would allow both variants and the different variants lead to different "on-durations" and instantaneous power levels.

This can be done in two ways:
a) at the modem input, coming from the application, where the modem indicates a threshold to the application in units of bits per audio frame, in case this is exceeded, the application itself 'throttles' the data to be sent per audio frame indicated in the dashed line 203.
b) at the modem output where the application indicates to the modem how much data will come in the next audio frame and the modem itself distributes the bits to be sent within the audio frame to achieve a low (constant, predictable) TX power, indicated in 204.

Usually, it is the goal of the UE to transmit data in the uplink as fast as possible, i.e., with the highest data rate possible. But there are certain scenarios where it is beneficial for the UE if the transmitted data rate is artificially reduced, i.e. throttled. This yields lower transmit (TX) power level and reduced cellular modem power consumption. The UE is for example kept at the lowest TX power possible, still being able to operate in its use case determined parameters and not impact the user experience.

One example is the following scenario: Due to the form factors e.g. of today's smartphones, thermal problems like overheating are typically critical. The cellular modem, especially with high TX power, is a significant contributor. Therefore, the TX power needs to be controlled also from a thermal point of view, i.e., in critical thermal cases the TX power needs to be reduced. The control of the Tx power can be beneficial for battery life also under normal conditions and coexistence scenarios.

Another possible scenario would be the need to temporarily reduce the TX power of a certain radio technology, e.g. of the LTE uplink, in order to stay within maximum device power or radiated power requirements when another radio technology is active such as WiFi (coexistence).

Furthermore, temporary reduction of UE transmission power could be applied to reduce UE uplink interference in highly loaded cells. This would improve network capacity and user experience of all UEs in the system.

Existing methods to resolve thermally critical conditions today are by de-rating the maximum transmit power level ("Tx power throttling"), re-using mechanisms established for corner cases, for example low battery voltage, or to resolve SAR (Specific Absorption Rate) violations in certain frequency bands. However, these approaches degrade user experience by reducing coverage at the cell edge or in scenarios with bad reception conditions at the base station.

The modem may also signal to the application processor that it shall enforce the applications generating the uplink traffic to reduce that traffic. However, this requires multiple non-standardized interfaces and it is unclear whether the apps react at all. Furthermore, there is probably a delay and low granularity in throttling.

For reduction of transmit power in the multi-RAT and max SAR use cases first simple mechanism have been defined in standards (e.g. "Power Management Maximum Power Reduction (P-MPR)" for LTE). However, those mechanisms are focused on compliance, e.g. in terms of SAR, but do not take user experience into account. Furthermore, the mechanisms proposed in this disclosure are more fine granular, more dynamic, more versatile (i.e. applicable to more scenarios), and can be used in the UE independently of support in the network for the other standardized features mentioned above.

A combination of methods to reduce the power consumption may be used by limiting the uplink throughput
  either before it reaches the modem buffer
  or by throttling the PHY layer throughput.

The exemplary methods presented in the following, which might have to be selected at runtime taking the behavior of the network and user into account, minimize the impact on the user experience.

Figure 3:
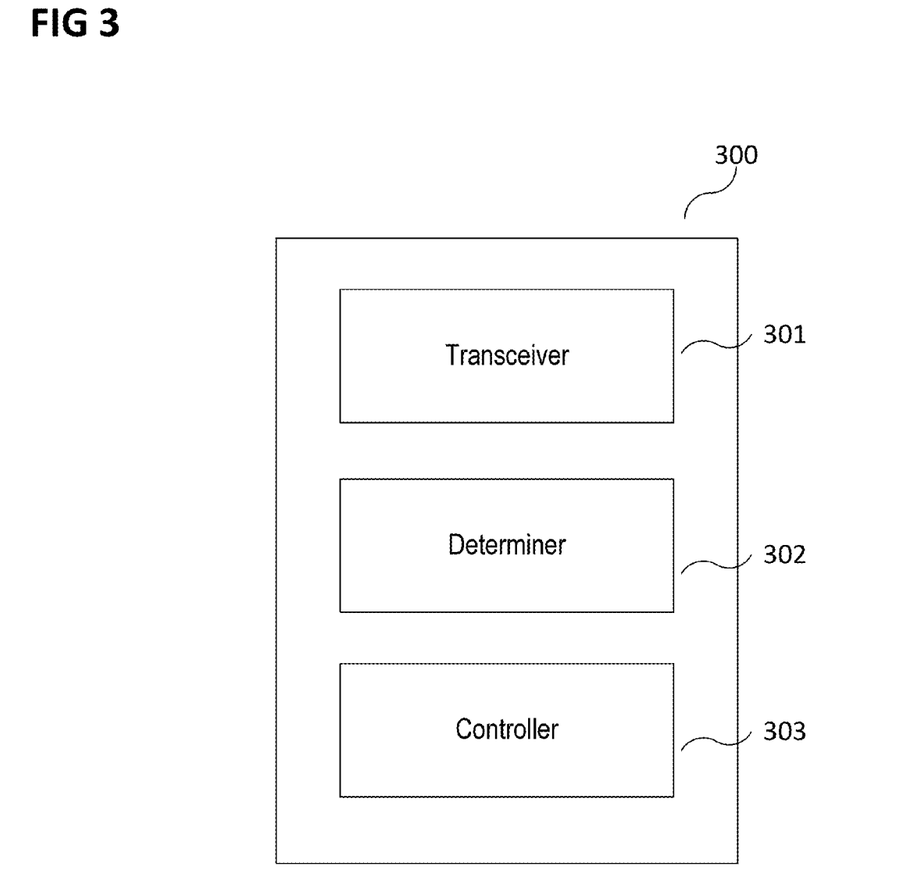
FIG. 3 shows a block diagram of a communication terminal device.

A mobile station which may for example be operated in the above described manner is shown in FIG. 3.

FIG. 3 shows a communication terminal device 300, comprising a transceiver 301. The transceiver 301 is configured to communicate with a communication device in accordance with an uplink resource allocation. The communication terminal device 300 further comprises a determiner 302. The determiner 302 is configured to determine a desired power consumption for data transmission from the communication terminal device to the communication device. Further, the determiner 302 is configured to determine a suitable uplink resource allocation based on the desired power consumption. Suitable uplink resource allocation describes a resource allocation strategy (like a profile) that is suitable because it results in low power and is characterized, for example, by longer low power or shorter high power transmissions. But also any other resource allocation parameters might play a role. Note that not only a single (e.g., per 1 ms TTI in LTE) resource allocation is meant but also the allocations over time. The communication terminal device 300 further comprises a controller 303. The controller 303 is configured to determine a communication behavior of the communication terminal device with the communication device based on the suitable uplink resource allocation. The controller 303 is further configured to control the transceiver according to the determined communication behavior. The mobile station cannot autonomously decide for a smaller resource allocation or a lower rate transport format. However, it may be able to influence the scheduling decision (number of PRBs, i.e. time/frequency elements, and Tx power assumption) of the eNodeB to reach a lower rate and lower power uplink grant. The determiner is configured to determine the desired power consumption for data transmission from the communication terminal device to the communication device with respect to a future behaviour and not only for a single allocation (i.e., a single transmission time interval).

The following examples pertain to further embodiments.

Example 1, as described with reference to FIG. 3, is a communication terminal device.

In Example 2, the subject matter of Example 1 can optionally include that the communication behavior includes disregarding at least one of allocated uplink data transmission grants and allocated uplink data retransmission grants received from the communication device (e.g. a base station or eNB). The mobile station (e.g. UE) may disregard the uplink data transmission and re-transmission grants received from the base station. Used with moderation, this might be a standards compliant approach (being unable to correctly receive an uplink grant on the downlink is always possible). The instantaneous transmit power per TTI could not be lowered by this way, but over a longer period of time, the average power would be reduced according to the percentage of skipped grants. For example in LTE, such behaviour by the UE could influence the link-adaptation algorithm in the eNB. The eNB could interpret the absent ("lost") transmissions as an indication of bad channel conditions triggering future scheduling grants that have lower MCS choices.

In Example 3, the subject matter of any one of Examples 1-2 can optionally include that the communication behavior includes controlling the transceiver to transmit an information item comprising information about the status of a buffer of the communication terminal device. Grant requests and transmission may be done based on a buffer that is filled at reduced rates. This can be achieved by adding additional queues that distinguish between the different QoS flows and limit the rate per flow according to the pre-defined goals. Based on the per flow buffer occupancy levels, the terminal could generate a buffer status or bandwidth request that it sends to the base station to request a scheduling grant. When it receives such an Uplink grant, the data would be taken from the queues and multiplexed onto the physical layer PDU, e.g., the transport block in LTE. The intended consequence of throttling the uplink data rates this way would be to reduce the instantaneous power consumption of the modem due to smaller/shorter resulting resource allocations on the PHY.

In Example 4, the subject matter of any one of Examples 1-3 can optionally include that the communication behavior includes controlling the transceiver to transmit information about a transmit power budget status of the communication terminal device which is reduced according to the current power consumption status of the communication terminal device. The transmit power budget is the power status that is signaled to the BS, which differs from the current status of the power consumption which relates to the mobile station's battery or thermal situation. The mobile station is transmitting an artificially reduced transmit power budget status according to the current power consumption status of the mobile station.

In Example 5, the subject matter of any one of Examples 1-4 can optionally include that the controller is configured to determine the communication behavior such that it initiates the communication device to provide the desired uplink resource allocation. The mobile station cannot autonomously decide for a smaller resource allocation or a lower rate transport format. To enable a mobile station to transmit data according to a smaller resource allocation or a lower rate transport format for these radio access technologies, e.g. LTE (which we consider as an example here), is thus to influence the scheduling decision (number of PRBs, i.e. time/frequency elements, and Tx power assumption) of the eNodeB to reach a lower rate and lower power uplink grant.

In Example 6, the subject matter of any one of Examples 1-5 can optionally include the communication terminal device is assigned to an uplink resource allocation and wherein the suitable uplink resource allocation comprises a reduction of the data rate of a selected modulation and coding scheme (MCS), wherein the number of allocated physical resource blocks (PRBs) is constant, compared to the assigned uplink resource allocation.

In Example 7, the subject matter of any one of Examples 1-6 can optionally include that the communication terminal device is assigned to an uplink resource allocation and wherein the suitable uplink resource allocation comprises a reduced number of allocated physical resource blocks (PRBs), wherein the modulation and coding scheme (MCS) is constant, compared to the assigned uplink resource allocation.

In Example 8, the subject matter of any one of Examples 1-7 can optionally include that the communication terminal device is assigned to an uplink resource allocation and wherein the suitable uplink resource allocation comprises a reduced percentage of allocated TTIs over a predetermined period of time, compared to the assigned uplink resource allocation.

In further examples the suitable uplink resource allocation may comprise a reduced or increased percentage of allocated TTIs over a predetermined period of time, compared to the assigned uplink resource allocation. The percentage of allocated TTIs over some considered (predetermined) period of time is a metric of how often the communication terminal is scheduled. In addition, power control commands as part of resource allocation as well as MIMO precoders for UL MIMO may be provided by the communication device. Furthermore, the allocation could be changed concerning all of the above mentioned aspects in many different combinations (e.g, "MCS up, PRBs down, TTIs up" or "MCS down, PRBs down, TTIs up") and it would be up to the proposed mechanism to decide if the reaction is desired or not and how it could be influenced.

There might be two ways (and combinations thereof) how the eNodeB can adapt its grant to a reduced uplink power budget:
   On the one hand, it can reduce the data rate of the selected MCS and keep the number of allocated PRBs constant. With less total power this will result in a reduced power spectral density per PRB that the eNB combats with a more robust transport format
   On the other hand, it can keep the MCS constant and reduce the number of PRBs in a way that the same power spectral density per PRB as before is reached (allowing the reception of the same MCS choice)

Both possible eNodeB reactions allow successful transmission with lower Tx power.

In Example 9, the subject matter of any one of Examples 1-7 can optionally include that the information about the transmit power budget status of the communication terminal device of the communication terminal device is a power headroom report. The power headroom report is an indication of how much power the UE would have left once uplink control information are transmitted according to the current (open-loop) power control settings.

In Example 10, the subject matter of any one of Examples 1-9 can optionally include that the determiner is configured to detect the uplink resource allocation of the communication device due to the communication behavior of the communication terminal device with the communication device based on the suitable uplink resource allocation. The UE cannot know in advance how the eNodeB would react but would have to use a behaviour detection mechanism to find out at runtime. The UE can for example figure out what kind of allocation it prefers, then the UE tries to trigger the communication device (e.g. a base station or eNB) to behave in the desired way. But in general, it cannot know how the communication device reacts to the triggers (unless the algorithms of the communication device would be known or could be controlled) so that the UE would have to determine how the communication device performs (i.e. changes) its resource allocation given the UE triggers. The UE would then change its feedback/triggering until the communication device behaves in the way the UE wants.

The detected uplink resource allocation of the eNB may include a reduced data rate of a selected modulation and coding scheme (MCS), wherein the number of allocated physical resource blocks (PRBs) is constant or a reduced number of allocated physical resource blocks (PRBs), wherein the modulation and coding scheme (MCS) may be constant upon receiving information about a transmit power budget status from the communication terminal device which is reduced according to the current power consumption status of the communication terminal device.

Furthermore, the detected uplink resource allocation of the eNB may include a reduced data rate of a selected modulation and coding scheme (MCS), wherein the number of allocated physical resource blocks (PRBs) may be constant or a reduced number of allocated physical resource blocks (PRBs), wherein the modulation and coding scheme (MCS) may be constant upon disregarding at least one of allocated uplink data transmission grants and allocated uplink data retransmission grants transmitted to the communication terminal device. Additional, the detected uplink resource allocation of the eNB may include an alteration of the data rate of a selected modulation and coding scheme (MCS) and of the number of allocated physical resource blocks (PRBs).

Furthermore, the detected uplink resource allocation of the eNodeB may include a reduced data rate of a selected modulation and coding scheme, wherein the number of allocated physical resource blocks is constant or a reduced number of allocated physical resource blocks, wherein the modulation and coding scheme may be constant upon receiving information about a buffer status report from the communication terminal device which is changed according to the current buffer status of the communication terminal device.

The resource allocation might be based on a combination of parameters, like frequency subbands, time intervals, transmit powers (potentially varying over the time and/or frequency dimension), modulation techniques, channel coding scheme and code rate, and spatial stream to transmit antenna mapping (precoding) for MIMO uplinks, too. A small adaption of e.g. PRBs, MCS, or the scheduling rate might also be part of the regular scheduling process.

In Example 11, the subject matter of any one of Examples 1-10 can optionally include that the communication behavior includes disregarding at least one of allocated uplink data transmission grants and allocated uplink data retransmission grants received from the communication device according to a predetermined rate. The percentage of skipped grants and the selection of which grants to use for transmitting data could be adapted to the severity of the necessary power limitations, e.g., in a critical thermal scenario.

In Example 12, the subject matter of any one of Examples 1-11 can optionally include that the controller is configured to determine the payload data, which is to be transmitted to the communication terminal device upon allocated uplink data transmission grants and allocated uplink data retransmission grants received from the communication device and to disregard at least one of allocated uplink data transmission grants and allocated uplink data retransmission grants received from the communication device based upon the determined type of data. The selection of skipped grants and the selection of which grants to use for transmitting data could be based on the payload so that important data, e.g. for RRC signalling, would never be dropped.

In Example 13, the subject matter of any one of Examples 1-12 can optionally include that the determination of the desired power consumption is based on a current thermal status of the communication terminal device. The communication behaviour of the mobile station to the base station could be adapted to the severity of the necessary power limitations, e.g., in a critical thermal scenario. Further examples may include that the determination of the desired power consumption is based on the current battery lifetime status. The communication behaviour of the mobile station to the base station could be adapted to the severity of the necessary power limitations, e.g., in normal conditions and coexistence scenarios.

In Example 14, the subject matter of any one of Examples 1-13 can optionally include that the communication device is a network communication device.

In Example 15, the subject matter of any one of Examples 1-14 can optionally include that the communication terminal device is a wireless communication terminal device.

The communication terminal device described above in conjunction with FIG. 3 can be operated by a method as described in conjunction with FIG. 4 in the following.

Figure 4:
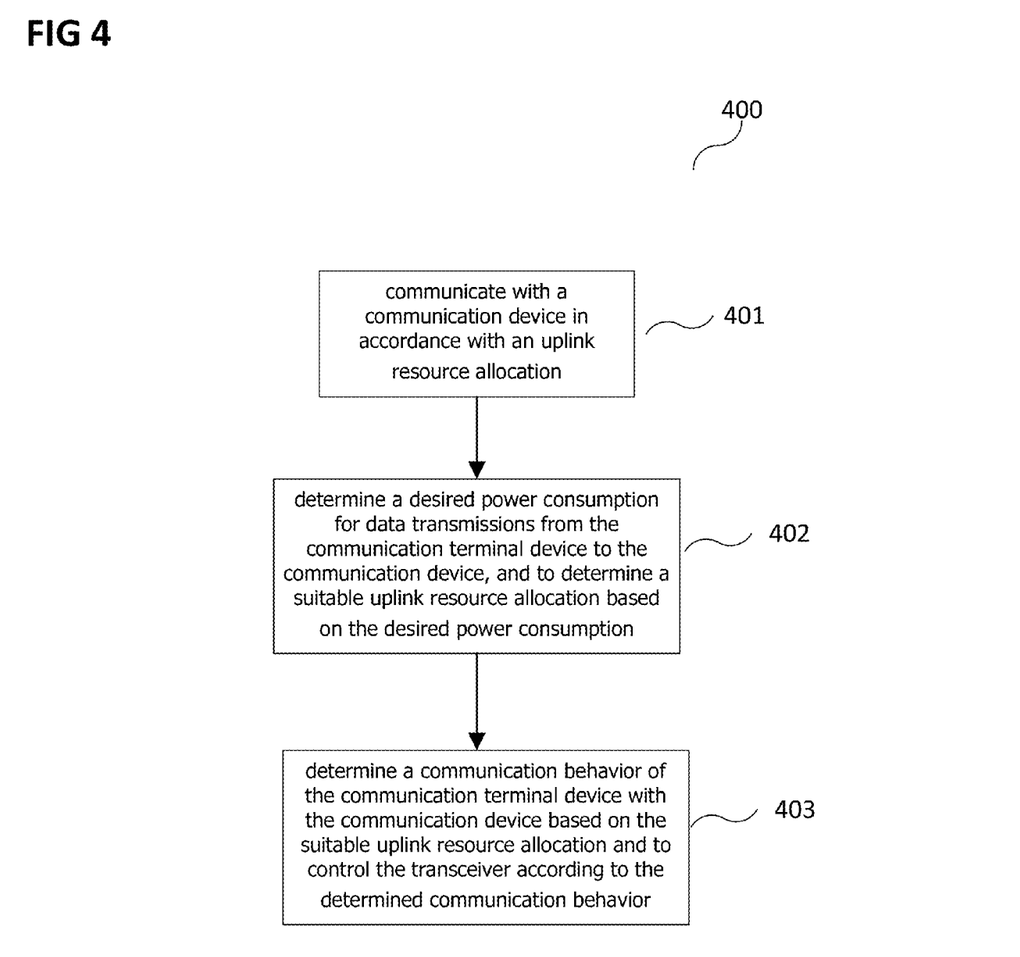
FIG. 4 FIG. 4 shows a flow diagram illustrating a method for operating a communication terminal device.

FIG. 4 shows a flow diagram 400 illustrating a method for operating a communication terminal device.

FIG. 4 shows a method for operating a communication terminal device, comprising in 401 the steps of communicating with a communication device in accordance with an uplink resource allocation; Further the method includes in 402 the step of determining a desired power consumption for data transmission from the communication terminal device to the communication device, and to determine a suitable uplink resource allocation based on the desired power consumption. Further the method includes in 403 the step of determining a communication behavior of the communication terminal device with the communication device based on the suitable uplink resource allocation and to control the transceiver according to the determined communication behavior.

The following examples pertain to further embodiments.

Example 16, as described with reference to FIG. 4, is a method for operating a communication terminal device.

In Example 17, the subject matter of Example 16 can optionally include that the communication behavior includes disregarding at least one of allocated uplink data transmission grants and allocated uplink data retransmission grants received from the communication device.

In Example 18, the subject matter of any one of Examples 16-17 can optionally include that the communication behavior includes controlling the transceiver to transmit an information item comprising information about the status of a buffer of the communication terminal device.

In Example 19, the subject matter of any one of Examples 16-18 can optionally include that the communication behavior includes controlling the transceiver to transmit information about a transmit power budget status of the communication terminal device which is reduced according to the current power consumption status of the communication terminal device.

In Example 20, the subject matter of any one of Examples 16-19 can optionally include the step of determining the communication behavior such that it initiates the communication device to provide the desired uplink resource allocation.

In Example 21, the subject matter of any one of Examples 16-20 can optionally include that the communication terminal device is assigned to an uplink resource allocation and wherein the suitable uplink resource allocation comprises a reduction of the data rate of a selected modulation and coding scheme (MCS), wherein the number of allocated physical resource blocks (PRBs) is constant, compared to the assigned uplink resource allocation.

In Example 22, the subject matter of any one of Examples 16-21 can optionally include that the communication terminal device is assigned to an uplink resource allocation and wherein the suitable uplink resource allocation comprises a reduced number of allocated physical resource blocks (PRBs), wherein the modulation and coding scheme (MCS) is constant, compared to the assigned uplink resource allocation.

In Example 23, the subject matter of any one of Examples 16-22 can optionally include that the communication terminal device is assigned to an uplink resource allocation and wherein the suitable uplink resource allocation comprises a reduced percentage of allocated TTIs over a predetermined period of time, compared to the assigned uplink resource allocation.

In further examples, the suitable uplink resource allocation may comprise a reduced or increased percentage of allocated TTIs over a predetermined period of time, compared to the assigned uplink resource allocation. The percentage of allocated TTIs over some considered (predetermined) period of time is a metric of how often the communication terminal is scheduled. In addition, power control commands as part of resource allocation as well as MIMO precoders for UL MIMO may be provided by the communication device. Furthermore, the allocation could be changed concerning all of the above mentioned aspects in many different combinations (e.g, "MCS up, PRBs down, TTIs up" or "MCS down, PRBs down, TTIs up") and it would be up to the proposed mechanism to decide if the reaction is desired or not and how it could be influenced.

In Example 24, the subject matter of Example 19 can optionally include that the information about the transmit power budget status of the communication terminal device of the communication terminal device is a power headroom report.

In Example 25, the subject matter of any one of Examples 16-24 can optionally include the step of detecting the uplink resource allocation of the communication device due to the communication behavior of the communication terminal device with the communication device based on the suitable uplink resource allocation.

The detected uplink resource allocation may include a reduced data rate of a selected modulation and coding scheme (MCS), wherein the number of allocated physical resource blocks (PRBs) is constant or a reduced number of allocated physical resource blocks (PRBs), wherein the modulation and coding scheme (MCS) is constant upon receiving information about a transmit power budget status from the communication terminal device which is reduced according to the current power consumption status of the communication terminal device.

Furthermore, the detected uplink resource allocation may include a reduced data rate of a selected modulation and coding scheme (MCS), wherein the number of allocated physical resource blocks (PRBs) is constant or a reduced number of allocated physical resource blocks (PRBs), wherein the modulation and coding scheme (MCS) is constant upon disregarding at least one of allocated uplink data transmission grants and allocated uplink data retransmission grants transmitted to the communication terminal device.

In addition the communication terminal device may be assigned to an uplink resource allocation and the suitable uplink resource allocation may comprise a reduced data rate of a selected modulation and coding scheme, wherein the number of allocated physical resource blocks is constant or a reduced number of allocated physical resource blocks, wherein the modulation and coding scheme is constant upon receiving information about a buffer status report from the communication terminal device which is changed according to the current buffer status of the communication terminal device.

In Example 26, the subject matter of any one of Examples 16-25 can optionally include that the communication behavior includes disregarding at least one of allocated uplink data transmission grants and allocated uplink data retransmission grants received from the communication device according to a predetermined rate.

In Example 27, the subject matter of any one of Examples 16-26 can optionally include the step of determining the payload data, which is to be transmitted to the communication terminal device upon allocated uplink data transmission grants and allocated uplink data retransmission grants received from the communication device and to disregard at least one of allocated uplink data transmission grants and allocated uplink data retransmission grants received from the communication device based upon the determined type of data.

In Example 28, the subject matter of any one of Examples 16-27 can optionally include that the determination of the desired power consumption is based on a current thermal status of the communication terminal device.

Example 29 is a computer readable medium having recorded instructions thereon which, when executed by a processor, make the processor perform a method for performing radio communication according to any one of Examples 16 to 28.

Example 30 is a communication terminal device comprising: means for communicating with a communication device in accordance with a uplink resource allocation; means for determining a desired power consumption for data transmissions from the communication terminal device to the communication device, and to determine a suitable uplink resource allocation based on the desired power consumption; and means for determining a communication behavior of the communication terminal device with the communication device based on the suitable uplink resource allocation and controlling the transceiver according to the determined communication behavior.

In Example 31, the subject matter of of Example 30 can optionally include that the communication behavior includes disregarding at least one of allocated uplink data transmission grants and allocated uplink data retransmission grants received from the communication device.

In Example 32, the subject matter of any one of Examples 30-31 can optionally include that the communication behavior includes controlling the transceiver to transmit an information item comprising information about the status of a buffer of the communication terminal device.

In Example 33, the subject matter of any one of Examples 30-32 can optionally include that the communication behavior includes controlling the transceiver to transmit an information about a transmit power budget status of the communication terminal device which is reduced according to the current power consumption status of the communication terminal device.

In Example 34, the subject matter of any one of Examples 30-33 can optionally include means for determining the communication behavior such that it initiates the communication device to provide the desired uplink resource allocation.

In Example 35, the subject matter of any one of Examples 30-34 can optionally include that the communication terminal device is assigned to an uplink resource allocation and wherein the suitable uplink resource allocation comprises a reduction of the data rate of a selected modulation and coding scheme, wherein the number of allocated physical resource blocks is constant, compared to the assigned uplink resource allocation.

In Example 36, the subject matter of any one of Examples 30-35 can optionally include that the communication terminal device is assigned to an uplink resource allocation and wherein the suitable uplink resource allocation comprises a reduced number of allocated physical resource blocks, wherein the modulation and coding scheme is constant, compared to the assigned uplink resource allocation.

In Example 37, the subject matter of any one of Examples 30-36 can optionally include that the communication terminal device is assigned to an uplink resource allocation and wherein the suitable uplink resource allocation comprises a reduced percentage of allocated TTIs over a predetermined period of time, compared to the assigned uplink resource allocation.

In Example 38, the subject matter of Example 33 can optionally include that the information about the transmit power budget status of the communication terminal device of the communication terminal device is a power headroom report.

In Example 39, the subject matter of any one of Examples 30-38 can optionally include means for detecting the uplink resource allocation of the communication device due to the communication behavior of the communication terminal device with the communication device based on the suitable uplink resource allocation.

In Example 40, the subject matter of any one of Examples 30-39 can optionally include that the communication behavior includes disregarding at least one of allocated uplink data transmission grants and allocated uplink data retransmission grants received from the communication device according to a predetermined rate.

In Example 41, the subject matter of any one of Examples 30-40 can optionally include means for determining the payload data, which is to be transmitted to the communication terminal device upon allocated uplink data transmission grants and allocated uplink data retransmission grants received from the communication device and to disregard at least one of allocated uplink data transmission grants and allocated uplink data retransmission grants received from the communication device based upon the determined type of data.

In Example 42, the subject matter of any one of Examples 30-41 can optionally include that the determination of the desired power consumption is based on a current thermal status of the communication terminal device.

In Example 43, the subject matter of any one of Examples 30-42 can optionally include that the communication device is a network communication device.

In Example 44, the subject matter of any one of Examples 30-43 can optionally include that the communication terminal device is a wireless communication terminal device.

Figure 5:
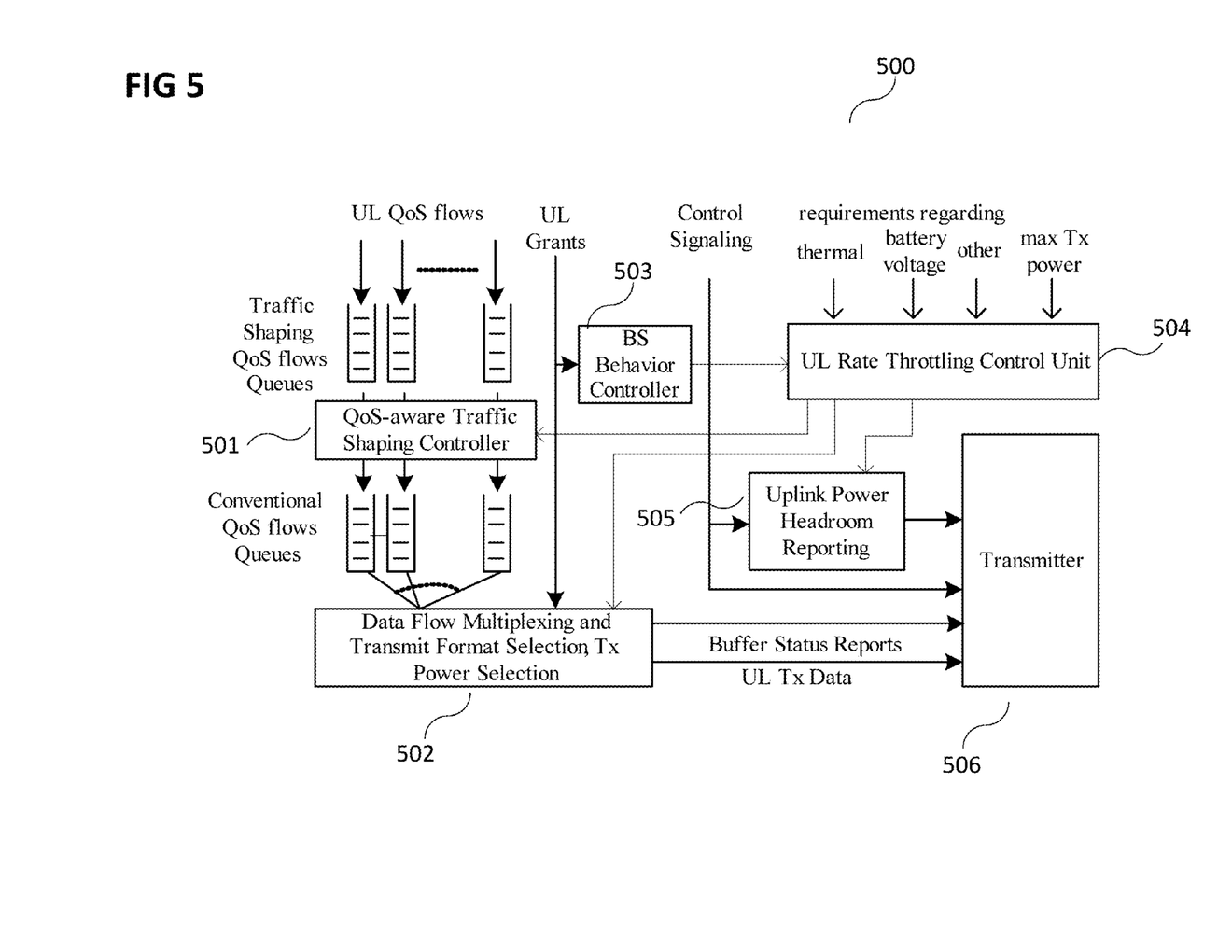
FIG. 5 shows a block diagram of a communication terminal device.

FIG. 5 shows a block diagram 500 of a communication terminal device.

Payload data streams from higher layers (e.g. IP packets) that might be classified into different QoS flows called, e.g., radio bearers in LTE are queued in traffic shaping QoS flows queues. A shaping controller 501 is aware of QoS traffic and may shape the QoS flow queues or may leave the QoS flow queues in conventional form depending on the QoS traffic. The data that hits the conventional queues is pre-shaped. Grant requests and transmission would then be done based on a buffer that is filled at reduced rates. This can be achieved by adding additional queues that distinguish between the different QoS flows and limit the rate per flow according to the pre-defined goals.

A multiplexer 502 is multiplexing the data flow received from the QoS flow queues and selects an appropriate transmission format. Based on the per flow buffer occupancy levels, the terminal could generate a buffer status or bandwidth request that it sends to the base station to request a scheduling grant. When it receives such an Uplink grant, the data would be taken from the queues and multiplexed onto the physical layer PDU, e.g., the transport block in LTE. Depending on the radio access technology, the amount of transported bits per QoS flow might be different based on the priorities of the individual flows. The buffer status report and Uplink Tx data are transmitted from the multiplexer 502 to the transmitter 506.

Received UL transmission grants or retransmission grants might be skipped. As the mobile station cannot know in advance how the base station will react, the mobile station detects the behaviour to find out at runtime with a base station behaviour controller 503.

The reduction of uplink transmission power might be due to thermal constraints, battery voltage constraints, concurrent transmissions on other RATs limiting allowed Tx power, etc. It is controlled by a UL rate throttling control unit 504. The feasible data rate and Tx power is to be reduced on the physical layer. The above mentioned requirements influence the communication behavior of the modem in order to fulfill the respective requirements. The control unit 504 receives information about the behaviour of the base station from the base station behaviour controller 503. The base station behaviour controller 503 corresponds in general to the controller as mentioned in connection with the communication terminal device described in FIG. 3.

Based on the information received from a control signal of a power unit of the mobile station and requirements received from the control unit 504 an artificially reduced power headroom report can be generated by an uplink power headroom reporting unit 505. The headroom report is transmitted to the transmitter 506.

The shaping controller 501, the multiplexer 502 and the reporting unit 505 receive information about certain requirements (thermal, battery voltage, concurrent transmissions on other RATs limiting allowed Tx power, etc.) from the control unit 504.

According to examples as described in the following an artificial bottleneck ("traffic shaping") in the uplink data buffer may for example be introduced where not all incoming bits from higher layers are actually considered for transmission immediately. An example for this is described with reference to FIG. 5. A modem typically receives payload data streams from higher layers (e.g. IP packets) that may be classified into different QoS flows called, e.g., radio bearers in LTE. Based on the per flow buffer occupancy levels, the terminal generates buffer status or bandwidth requests that it sends to the base station to request a scheduling grant. When it receives such an Uplink scheduling grant, it takes the data from the queues and multiplexes them onto the physical layer PDU, e.g., the transport block in LTE. Depending on the radio access technology, the amount of transported bits per QoS flow might be different based on the priorities of the individual flows. For example, a modem would request new Uplink grants as long as it has data to transmit in the queues and would also react to a growing data backlog by sending more scheduling requests.

According to examples as described in the following the data that hits the conventional queues is for example pre-shaped. Grant requests and transmission would then be done based on a buffer that is filled at reduced rates. This can be achieved by adding additional queues that distinguish between the different QoS flows and limit the rate per flow according to the pre-defined goals. The prioritization could differ from the standard approach, for example, important radio link control messages could be preferred or VoIP transmissions might be exempted from throttling to avoid call drops. From an application point of view, as seen by the user of the mobile station, the traffic shaping would be perceived as a slow uplink transmission situation that could not be distinguished, e.g., from bad channel conditions, an overloaded cell, or even a congested backbone network. From the network's point of view, the traffic shaping would typically be perceived as if the terminal only generated uplink data at a low rate for which not many UL resources have to be provisioned.

The intended consequence of throttling the uplink data rates this way would be to reduce the instantaneous power consumption of the modem due to smaller/shorter resulting resource allocations on the PHY. Also, a user might perceive the throttling as a (slight) performance degradation to which he might adapt his behavior, e.g., to avoid performing high data rate transmissions like video call, video upstream in conference broadcast, video upstream of surveillance devices, etc. or to accept lower video quality. In this case, the graceful degradation would have induced a change in the user's behavior.

Ultimately, the buffer fragment used for the service to be throttled could overflow. It is assumed that there are in any case mechanisms present that interrupt an application if a Radio Link Failure (RLF) has occurred. Ultimately the user would stop for example an upload if he/she does not succeed with it.

It should be noted that with the throttling in place, certain applications that have to transmit a fixed large amount of data might simply be transmitting longer resulting in overall higher energy consumption over time. If according to examples as described above the shaping of the amount of data that is considered for uplink transmission is not sufficient, or if for some other reason (thermal, battery voltage, concurrent transmissions on other RATs limiting allowed Tx power, etc.) the feasible data rate and Tx power is to be reduced on the physical layer, several PHY-related mechanisms as outlined below can be used.

Depending on the service type, to limit the amount of transmissions (in the time domain) at the cost of a rather wide-band and/or high power transmission, or to limit the transmit power at the cost of an increased amount of Uplink grants (in the time domain) required to transmit at the required longer-term rate, might influence the transmission data rate of the mobile station.

This might depend on how much power can be saved during non-Tx TTIs, how linear the energy consumption of the transmitter is as a function of emitted Tx power, how much a penalty a higher order modulation scheme is (64 QAM vs. QPSK), how much a transmitter design can gain from having PRB-wise small allocations, etc.

It is assumed that the trade-off depends on factors that can only be evaluated during operation. In that case the device comprises a smart controller that continuously learns the eNB behavior and accordingly controls the amount of scheduling requests and buffer status reports sent in such a way that the eNB is either triggered to provide many "small" Uplink grants or few "big" Uplink grants depending on the active service. If the UE has successfully adapted to trigger the eNB to perform either "many small" or "few big" allocations for power saving, the controller could always be active not only in thermally critical situations. An exemplary realization for this is described with reference to FIG. 5.

In case that more low-power grants would be preferred, the behavior, for example, of an audio or video transmission in a conversational context (i.e. VoIP call such as Skype) where the audio data is usually structured in real-time frames (e.g. 20 ms) could be modified. During that period (e.g., of an audio/video frame) the audio data bits need to go out from the UE to arrive at the receiver with a certain delay deadline. The amount of data within a single real-time frame can vary depending on the source coding during each frame on application level.

In an exemplary implementation, as soon as the input queue has data to transmit, the base station schedules the modem to send out the data as quick as possible, resulting in max TX power for a duration x per audio frame. In order to reduce the data transmission rate of the mobile station it would be desired that the modem instead will send out the data within one audio frame with much lower power. This can be achieved by spreading the TX power within this audio frame to a wider duration y>x.

This can be done in two ways:
at the modem input, coming from the application, where the modem indicates a threshold to the application in units of bits per audio frame, in case this is exceeded, the application itself 'throttles' the data to be sent per audio frame
at the modem output where the application indicates to the modem how much data will come in the next audio frame and the modem itself distributes the bits to be sent within the audio frame to achieve a low (constant, predictable) TX power.

Assuming the mobile station follows the uplink grant, it could autonomously decide to transmit with a lower power than assumed by the base station's scheduler in order to save energy (i.e., disregarding explicit power control commands that might, e.g., request to increase transmit power). However, this can easily lead to an insufficient SINR ratio and thus a lost transmission at the base station which would then trigger a HARQ retransmission so that overall the energy consumption at the mobile station for transmitting the considered payload might even be higher For these radio access technologies, e.g. LTE (which is considered as an example here), the scheduling decision (number of PRBs, i.e. time/frequency elements, and Tx power assumption) of the eNodeB may be influenced to reach a lower rate and lower power uplink grant. One way to achieve this would be to signal an artificially reduced power headroom to the eNodeB. An exemplary realization for this is described with reference to FIG. 5.

The power headroom is an indication of how much power the UE would have left once uplink control information are transmitted according to the current (open-loop) power control settings. Artificially reducing the power headroom report may allow the UE to apply this reduction to subsequent uplink transmissions because the transport format (MCS) and PRB size of future UL grants scheduled by the eNodeB to take this power limitation into account so that the expected block error rate should not be negatively impacted. The eNodeB may use two ways (and combinations thereof) how it can adapt its grant to a reduced uplink power budget.

On the one hand, it can reduce the data rate of the selected MCS and keep the number of allocated PRBs constant. With less total power this typically results in a reduced power spectral density per PRB that the eNB combats with a more robust transport format.

On the other hand, it can keep the MCS constant and reduce the number of PRBs in a way that the same power spectral density per PRB as before is reached (allowing the reception of the same MCS choice).

Further, the percentage of allocated TTIs over a predetermined period of time may for example be reduced or increased, compared to the assigned uplink resource allocation. The percentage of allocated TTIs over some considered (predetermined) period of time is meant as a metric of how often the communication terminal is scheduled. In addition, power control commands as part of resource allocation as well as MIMO precoders for UL MIMO may be provided by the communication device. Furthermore, the allocation could be changed concerning all of the above mentioned aspects in many different combinations (e.g, "MCS up, PRBs down, TTIs up" or "MCS down, PRBs down, TTIs up") and it would be up to the proposed mechanism to decide if the reaction is desired or not and how it could be influenced.

All possible eNodeB reactions might allow successful transmission with lower Tx power. The UE cannot know in advance how the eNodeB would react but would have to use a behaviour detection mechanism to find out at runtime.

Another way would be to simply disregard the uplink data transmission and re-transmission grants received from the base station. Used with moderation, this might be a standards compliant approach (being unable to correctly receive an uplink grant on the downlink is always possible). This way the instantaneous transmit power per TTI could not be lowered, but over a longer period of time, the average power would be reduced according to the percentage of skipped grants. The percentage of skipped grants and the selection of which grants to use for transmitting data could be adapted to the severity of the necessary power limitations, e.g., in a critical thermal scenario. Also, the selection can be based on the payload so that important data, e.g. for RRC signalling, would never be dropped. An exemplary realization is described with reference to FIG. 5.

It should be noted that, for example in LTE, such behaviour by the UE could influence the link-adaptation algorithm in the eNB. It could interpret the absent ("lost") transmissions as an indication of bad channel conditions triggering future scheduling grants that have lower MCS choices. If the proposed BS behaviour controller in the UE was able to detect that the eNodeB reduced the MCS just because of skipped transmissions, the UE could actually further exploit the more robust choice of MCS by reducing its transmit power to a level that still supports the adapted MCS level. That way, an initial skipping of grants would induce an eNodeB behaviour that would then allow additional power savings in the UE.

It should be noted that one or more of the features of any of the examples above may be combined with any one of the other examples.

While the communication terminal device and method for operating a communication terminal device is described in conjunction with LTE, it should be understood that LTE is only an example and the disclosed communication terminal device and method for operating a communication terminal device can also be applied to other wireless radio access technologies like e.g. UMTS/3G, WLAN, but not limited thereto.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A communication terminal device comprising:
a transceiver configured to communicate with a communication device in accordance with an uplink resource allocation;
a determiner configured to determine a desired power consumption for data transmissions from the communication terminal device to the communication device, and to determine a suitable uplink resource allocation based on the desired power consumption; and
a controller configured to:
monitor uplink data transmission grants received from the communication device to adaptively predict a future scheduling behavior of the communication device;
determine a deceptive communication behavior for the communication terminal device based on the predicted future scheduling behavior of the communication device and the suitable uplink resource allocation; and
control the transceiver according to the deceptive communication behavior to influence the communication device to assign the suitable uplink resource allocation to the communication terminal device, wherein the controller is configured to control the transceiver according to the deceptive communication behavior to influence the communication device to assign the suitable resource allocation to the communication terminal device by:
identifying an uplink data transmission grant for the communication terminal device;
determining a type of data scheduled for transmission in the uplink data transmission grant; and
refraining from responding to the uplink data transmission grant based on the type of data scheduled for transmission in the uplink data transmission grant.

2. The communication terminal device according to claim 1, wherein the communication device is a network communication device.

3. The communication terminal device according to claim 1, wherein the communication terminal device is a wireless communication terminal device.

4. The communication terminal device according to claim 1, wherein the controller is configured to control the transceiver according to the deceptive communication behavior to influence the communication device to assign the suitable resource allocation to the communication terminal device by:
controlling the transceiver to transmit a deceptive buffer status report that indicates that a transmit buffer of the communication terminal device is less full than the transmit buffer actually is.

5. The communication terminal device according to claim 1, wherein the controller is configured to control the transceiver according to the deceptive communication behavior to influence the communication device to assign the suitable resource allocation to the communication terminal device by:
controlling the transceiver to transmit a deceptive transmit power status that indicates that a transmit power budget of the communication terminal device is less than an actual transmit power budget status of the communication terminal device.

6. The communication terminal device according to claim 1, wherein the controller is further configured to:
receive an assigned resource allocation from the communication device in response to the deceptive communication behavior; and
adjust the deceptive communication behavior based on whether the assigned resource allocation matches the suitable uplink resource allocation.

7. The communication terminal device according to claim 1, wherein the desired power consumption is less than a current power consumption for data transmissions from the communication terminal device.

8. The communication terminal device according to claim 1, wherein the suitable uplink resource allocation has a smaller data rate than the uplink resource allocation and the same number of allocated transmission resource blocks as the uplink resource allocation.

9. The communication terminal device according to claim 1, wherein the suitable uplink resource allocation has fewer allocated transmission resource blocks than the uplink resource allocation and the same data rate as the uplink resource allocation.

10. The communication terminal device according to claim 1, wherein the controller is further configured to:
monitor uplink data transmission grants received from the communication device following the deceptive communication behavior by the transceiver to adaptively learn an updated scheduling behavior of the communication device;
select an updated deceptive communication behavior for the communication terminal device based on the updated scheduling behavior and the suitable uplink resource allocation; and
control the transceiver according to the updated deceptive communication behavior to influence the communication device to assign the suitable uplink resource allocation to the communication terminal.

11. The communication terminal device according to claim 1, wherein the determiner is configured to determine the desired power consumption based on a current thermal status of the communication terminal device.

12. The communication terminal device according to claim 1, wherein the deceptive communication behavior comprises modifying one or more of buffer status reports, power headroom reports, or scheduling requests.

13. A communication terminal device comprising:
a transceiver configured to communicate with a communication device in accordance with an uplink resource allocation;
a determiner configured to determine a desired power consumption for data transmissions from the communication terminal device to the communication device, and to determine a suitable uplink resource allocation based on the desired power consumption; and
a controller configured to:
control the transceiver to transmit a deceptive status of the communication terminal device to the communication device to influence the communication device to assign the suitable resource allocation to the communication terminal device;
identify one or more uplink data transmission grants for the communication terminal device;
determine a type of data scheduled for transmission in the one or more uplink data transmission grants; and
refrain from responding to at least one of the one or more uplink data transmission grants based on the type of data scheduled for transmission in the one or more uplink data transmission grants.

14. The communication terminal device of claim 13, wherein the controller is configured to skip the at least one of the one or more uplink data transmission grants according to the suitable resource allocation by:
refraining from transmitting uplink data to the communication device according to the at least one of the one or more uplink data transmission grants.

15. The communication terminal device of claim 13, wherein the controller is configured to skip the at least one of the one or more uplink data transmission grants according to the suitable uplink resource allocation by:
skip the at least one of the one or more uplink data transmission grants according to a predetermined rate.

16. A method for operating a communication terminal device, the method comprising:
communicating with a communication device in accordance with an uplink resource allocation;
determining a desired power consumption for data transmissions from the communication terminal device to the communication device, and to determine a suitable uplink resource allocation based on the desired power consumption;
transmitting a deceptive status of the communication terminal device to the communication device to influence the communication device to assign the suitable resource allocation to the communication terminal device;
identifying one or more uplink data transmission grants for the communication terminal device;
determining a type of data scheduled for transmission in the one or more uplink data transmission grants; and
refraining from responding to at least one of the one or more uplink data transmission grants based on the type of data scheduled for transmission in the one or more uplink data transmission grants.

17. The method of claim 16, where skipping the at least one of the one or more uplink data transmission grants according to the suitable uplink resource allocation comprises:
refraining from transmitting uplink data to the communication device in response to the at least one of the one or more uplink data transmission grants.

* * * * *